(12) United States Patent
Lee

(10) Patent No.: US 6,389,281 B1
(45) Date of Patent: May 14, 2002

(54) METHOD FOR AUTOMATICALLY TESTING A BASE TRANSCEIVER STATION IN A MOBILE TELECOMMUNICATION SYSTEM

(75) Inventor: Kyung-jae Lee, Sungnam (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/312,792

(22) Filed: May 17, 1999

(30) Foreign Application Priority Data

May 19, 1998 (KR) .......................................... 1998-18031

(51) Int. Cl.[7] ................................................. H04Q 7/20
(52) U.S. Cl. ....................... 455/423; 455/424; 455/67.1
(58) Field of Search ................................ 455/423, 424, 455/67.1, 67.4, 677, 67.2, 425; 379/1; 395/712, 200.1

(56) References Cited

U.S. PATENT DOCUMENTS

| | | | | |
|---|---|---|---|---|
| 5,548,820 A | * | 8/1996 | Victorin ...................... | 455/67.4 |
| 5,654,901 A | * | 8/1997 | Boman ........................ | 395/712 |
| 5,805,982 A | * | 9/1998 | Hulsebosch .................. | 455/62 |
| 6,122,505 A | * | 9/2000 | Genell et al. ................ | 455/424 |
| 6,215,997 B1 | * | 4/2001 | Han ............................ | 455/423 |

* cited by examiner

Primary Examiner—Daniel Hunter
Assistant Examiner—Lana Le
(74) Attorney, Agent, or Firm—Dilworth & Barrese, LLP

(57) ABSTRACT

A method for automating a test of a base transceiver station in a mobile telecommunication system is disclosed. In a base station manager (BSM) for managing a plurality of base transceiver stations providing communication service to mobile stations that move within a service coverage area, the method comprises the steps of checking whether an operator is registered, receiving parameters for command of test items, and selecting commands of test items to test base transceiver stations. When parameters are not inputted, a default parameter is read, but when parameters are inputted, the inputted parameters are saved as new default. Not only the selected test items, but also all test items under the selected test items are automatically executed at a time. The results of testing is stored and outputted in accordance with identification of systems selected by an operator.

18 Claims, 3 Drawing Sheets

FIG. 2

| NO. | ITEM |
|---|---|
| 1. INITIALIZING TEST | |
| 1.1 DOWNLOAD TEST | |
| 010101 | STANDBY LOADING TEST |
| 010102 | CCP DOWNLOAD TEST |
| 010103 | ACP DOWNLOAD TEST |
| 010104 | SIP DOWNLOAD TEST |
| 010105 | SVP DOWNLOAD TEST |
| 010106 | CSP DOWNLOAD TEST |
| | |
| 1.2 RESTARTING | |
| 010201 | RE-STARTING BY A MMC |
| 010202 | RE-STARTING BY HARDWARE RESET |
| 010203 | LOADING STATUS OUTPUT |
| | |
| 2. SYSTEM STATUS OUTPUT | |
| 020001 | ALARM STATUS OUTPUT |
| 020002 | ALARM MESSAGE OUTPUT RESTRAINT/RELEASE |
| 020003 | RESTRAINED ALARM HISTORY OUTPUT |
| 020004 | AUDIBLE ALARM RESTRAINT/RELEASE |
| 020005 | ALARM CONTINUATION/RISING FUNCTION |
| 020006 | FAULT LIST OUTPUT |
| 020007 | FAULT MESSAGE OUTPUT RESTRAINT/RELEASE |
| 020008 | RESTRAINED FAULT LIST OUTPUT |
| 020009 | STATUS MESSAGE OUTPUT RESTRAINT/RELEASE |
| 020010 | RESTRAINED STATUS HISTORY OUTPUT |
| 020011 | VERSION NUMBER OUTPUT FUNCTION |

METHOD FOR AUTOMATICALLY TESTING A BASE TRANSCEIVER STATION IN A MOBILE TELECOMMUNICATION SYSTEM

BACKGROUND

1. Field of the Invention

The present invention relates generally to testing methods in a mobile telecommunication system, and more particularly, to a method for automatically testing a base transceiver station (BTS).

2. Description of the Related Art

In U.S. Pat. No. 4,545,013 ('013 patent) entitled Enhanced Communication Network Testing and Control System, there is disclosed a conventional communication network testing method. In accordance with the '013 patent, a central management system connected to a plurality of remote sites automatically monitors the network including all its constituent elements and regularly updates the status of each element. The central management system executes an automatic test on selected sites in the network without the need for operator intervention. In addition, provisions exist for manual operator commands to execute certain tests and controls.

As described above, conventional testing methods monitor each site using a central management system connected to a plurality of sites. Conventional testing methods, however, are sometimes difficult to apply to a mobile telecommunication system including complicated subsystems and a plurality of elements. Further, the conventional method can not test a plurality of systems simultaneously and cannot output the test results in accordance with the system classifications. This requires the user to spend an inordinate amount of time searching through the test results.

FIG. 1 illustrates the hierarchical structure of a typical mobile telecommunication system employing code division multiple access (CDMA) comprising a plurality of mobile stations (MS) (50, 51) base transceiver stations (BTS) (40, 41) base station controllers (BSC) (30, 31) and a mobile switching center (MSC) 20. Each BTS provides communication service to the mobile stations within a corresponding service coverage area and the MSC connects the BSCs that control the BTSs to a public switched telephone network (PSTN) 10. The BTSs and BSCs are grouped with a particular BTS.

An operator controls base transceiver stations dispersed over a wide geographic range through a base station manager (BSM) (not shown). The BSM is connected to a plurality of BTSs (40, 41) and BSCs (30, 31) to perform system management and maintenance functions. An operator is able to determine the status of each BTS and BSC via the BSM and can test the function of any BTS connected to the BSM. The various functions of the BTSs and BSCs are described in FIG. 2 including some test items which can be performed via the BSM (see item 1). A base transceiver station (BTS) and a base station controller (BSC) each include a plurality of processors which are tested individually in accordance with the predefined test items. The BSC includes a call control processor (CCP), an alarm control processor (ACP), a selector interface processor (SIP), a selector and vocoder processor (SVP) and a common channel signaling processor (CSP). Test items associated with the BSC may be generally classified into initiation tests (category 1, FIG. 2) and system status output (category 2, FIG. 2).

The initiation test, category 1, further comprises a download test, category 1.1, and a re-starting test, category 1.2. The download test category includes a standby loading test, a CCP download test, a ACP download test, a SIP download test, a SVP download test and a CSP download test. The re-starting test includes a re-starting by a man machine command (MMC), a re-starting by hardware reset and loading history output.

The system status output, category 2, includes an alarm status-output test, an alarm message output restraint/release, restrained alarm history output, an audio alarm restraint/release, an alarm continuation/raising function, a fault list output, a fault message output restraint/release, restrained fault list output, a status message output restraint/release, restrained status history output, version number output and so on.

In accordance with conventional testing methods, inevitably some steps are redundant in executing the test item. For example, an operator inputs a command specific to a particular test item and an associated parameter range (e.g., BSCs 0 to 3, and SVPs 0 to 3. etc) with the test results being output to a BSM. The BSM analyzes the test results to determine whether the test is normally performed. When performing another test item, certain substeps from the previous test are unnecessarily repeated.

Consequently, for properly testing a BTS, an operator should input all the test item commands while referring to a manual. This process is time consuming and prevents the system from performing other system functions, such as communication service, during the trusting. As such, the tester monopolizes the system during the testing phase.

In addition, for each function test command, basic parameters need to be input each time. Since alarm and state messages are periodically reported from all the systems connected to a corresponding base station manager during testing, the operator should analyze each message from the history of the test results after identifying desired systems to see the results of testing of the desired systems.

SUMMARY OF THE PRESENT INVENTION

It is therefore an object of the present invention to provide a method for automating a test of a base transceiver station by automatically executing commands corresponding to the subtest categories for each selected test category.

It is another object of the present invention to provide a method for saving the initial system parameter values as default values and updating them as needed. It is still another object of the present invention to provide a method for classifying, saving and outputting the automated test results.

The above objects are achieved by a novel and improved method for automatically testing base transceiver stations (BTSs) in a mobile telecommunication system comprising the steps of: checking by a base station manager (BSM) whether input parameters for testing a BTS have been input; reading the input parameters; otherwise using default parameter values when the input parameters are not supplied; selecting commands for items to be tested in the BTS; and executing the selected commands using the input parameters or the default parameters.

According to a second aspect of the present invention, there is provided a method for automatically testing a base transceiver station (BTS) in a mobile telecommunication system comprising the steps of: confirming by a base station manager (BSM), which remotely manages a plurality of BTSs, whether an operator designated to test the BTS is registered or not; checking by the BSM whether parameter values for command of a test item of BTS have been input, saving the input parameter values as default parameters, reading default parameters when the parameters are not input by the operator, for test items of a BTS classified into a plurality of large items, middle items and small items, selecting some or all large items among the plurality of large items, executing the commands for the small test items included as part of the selected large items, saving the test results as a file after execution of the test and displaying the test results on a screen.

According to a third aspect of the present invention, there is provided a method for automatically testing a base transceiver station (BTS) in a mobile telecommunication system comprising the steps of: classifying by a base station manager (BSM) the test items of the BTS and the inner device of the BTS into a plurality of large items, a plurality of middle items and a plurality of small items, and automatically executing the commands for all small items included as part of a large or middle item category.

BRIEF DESCRIPTION OF THE DRAWINGS

FIG. 2 is a table of test items for testing a base station controller according to the prior art.

DETAILED DESCRIPTION OF THE PRESENT INVENTION

According to the present invention, the method of automatically testing a BTS generally include an operator executing a test, saving the results of the test and outputting the results of the test. Further, the operator classifies all the commands provided by a base station manager (BSM) into some items for batch processing, each of which is corresponding to each small item. Since the procedures are generalized and the parameters are saved by default, when an operator re-executes a test following the same procedures, the operator can avoid inputting the same parameter each time.

Figure 1:
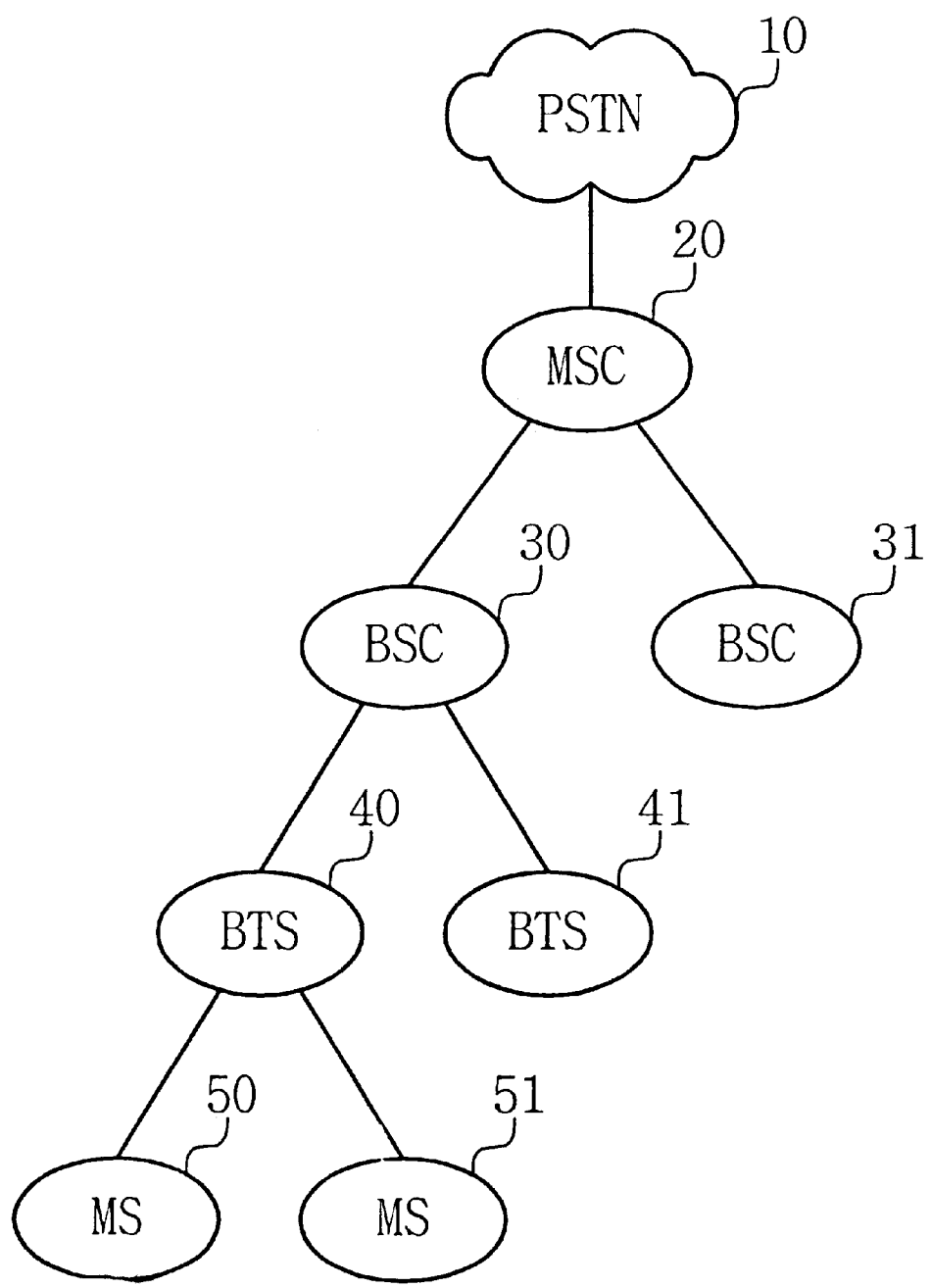
FIG. 1 is a simplified block diagram of a mobile telecommunication system in accordance with the prior art.
Figure 3:
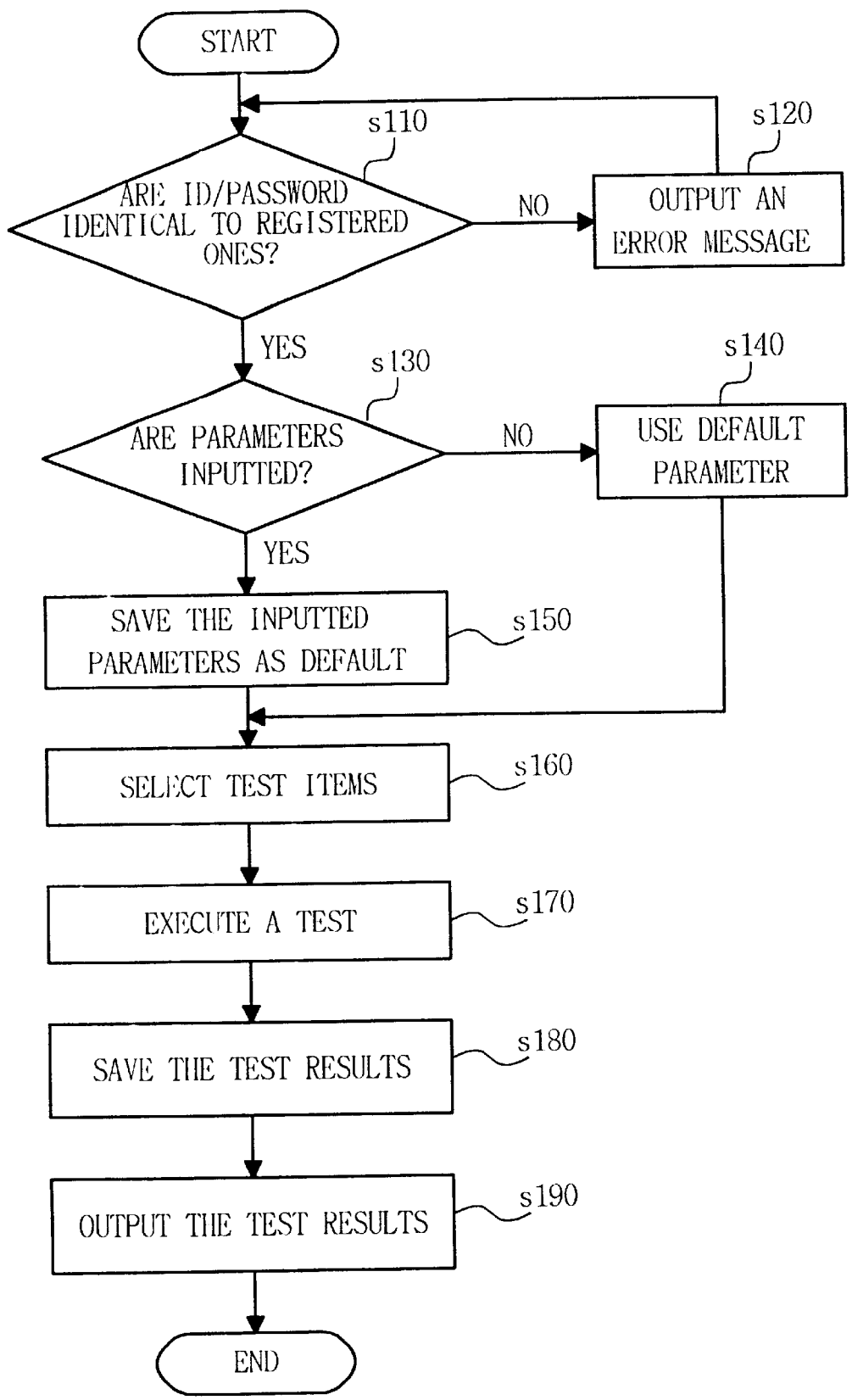
FIG. 3 is a flow chart illustrating an automatic test of a base transceiver station according to the present invention.

FIG. 3 is a flow chart illustrating a method for the automatic test of a base transceiver station (BTS) according to the present invention. At step 110, when an operator starts to execute a test, the operator inputs his/her own identification and password. The inputted identification and password supplied by the operator are identified at step 110. When the identification and password are not identical to a registered version, the operator fails the login procedure and an error message is output at step 120. This process prevents a non-registered operator from executing a test.

At step 130, when the identification and password are correct, the operator supplies a system parameter input which is checked for correspondence to an identification range of systems or devices that are going to be tested. When the system parameter is not input by the operator, a default system parameter is used at step 140. When a system parameter is input, the parameter may be saved as default at step 150. Saving the system parameter is optional. System and device parameters that are frequently tested may be saved as default values for batch processing.

Test items are selected at step 160. Test items are grouped into a multi-layer hierarchy. Selecting a particular test level automatically invokes the subordinate tests corresponding to the selected level. All the selected commands are executed simultaneously at step 170.

For example, when the operator selects a download test (see item 1.1 of FIG. 2), the six subordinate tests including the standby loading test, the CCP download test, the ACP download test, the SIP download test, the SVP download test and the CSP download test are automatically executed in step 170.

During the testing process, the test results are automatically saved at step 180 and output at step 190. The file of the saved results may be recalled and analyzed by the operator. Also, the test results are classified according to the BSC or BTS that an operator selects.

According to the present invention, a method for testing base transceiver stations further includes a function of saving default parameters thereby avoiding having to re-input basic parameters thereby reducing the operator's burden.

In addition, the test results are classified and saved in accordance with the system identification of BSCs and BTSs that an operator selects, so that test results associated with other BSCs and BTSs are not inadvertently saved or output.

The base transceiver station tests are executed more quickly and more accurately by simultaneously executing commands corresponding to a large item that an operator selects.

While the invention is susceptible to various modification and alternative forms, specific embodiments thereof have been shown by way of example in the drawings and detected description. It should be understood, however, that the present invention is to cover all modifications, equivalents, and alternative falling within the spirit and scope of the invention as defined by the appended claims.

What is claimed is:

1. A method for automatically testing a base transceiver station (BTS) in a mobile telecommunication system, comprising the steps of:

checking whether input parameters for testing a base station transceiver (BTS) are default parameters or not;

reading said input parameters when said input parameters are not default parameters;

reading default parameters pre-stored in a base station manager BSM when said input parameters are default parameters;

selecting commands stored in said BSM for testing a component of said BTS; and executing said selected commands using one of said input parameters and said default parameters to determine a status of said BTS.

2. The method as set forth in claim 1, further comprising a step of confirming whether an operator conducting said BTS test is registered prior to said checking step.

3. The method as set forth in claim 2, wherein said confirming step further comprises the steps of:

identifying a supplied identification (ID) and a supplied password input by said operator; and outputting an error message when said supplied identification and password do not correspond to a registered respective identification and password.

4. The method as set forth in claim 1, further comprising a step of saving said input parameters as default parameters.

5. The method as set forth in claim 1, further comprising a step of saving results of said testing as a file.

6. The method as set forth in claim 5, wherein at said saving step, the test results are classified in accordance with a system identification selected by an operator and said test results are saved in accordance with said system identification.

7. The method as set forth in claim 1, further comprising a step of outputting said test results on a display screen after said execution step.

8. The method as set forth in claim 7, wherein at said outputting step, said test results are classified in accordance with a system identification selected by an operator and said test results are output in accordance with said system identification.

9. The method as set forth in claim 1, wherein said input parameters and default parameters include identifications of constituent components of said base transceiver stations to be tested.

10. The method as set forth in claim 1, wherein at said selecting step, if at least one large item among a plurality of large items is selected, then commands of middle items and small items which define a subclass of said selected large items are selected by default.

11. The method as set forth in claim 1, wherein in said selecting step, the commands for small items which define a subclass of said selected large items are automatically executed.

12. A method for automatically testing one or more base transceiver stations (BTS) being remotely managed by a base station manager (BSM) in a mobile telecommunication system, said BTS test comprising a plurality of large item tests, a plurality of middle item tests, and a plurality of small item tests, the method comprising the steps of:

confirming whether a BTS test operator is registered;

checking whether or not input parameters associated with test commands are default parameters;

saving said input parameters when said input parameters are not default parameters;

reading previously stored default parameters when said input parameters are default parameters;

selecting at least one large item test;

executing the commands for the small test items included in said selected large items using one of said input parameters or said default parameters;

saving the executed test results as a file; and outputting said test results on a display screen.

13. The method as set forth in claim 12, wherein said confirming step further comprises the steps of:

identifying an identification (ID) and a password input by said operator; and outputting an error message when said operator supplied identification and password are not identical with a respective registered identification and password.

14. The method as set forth in claim 12, wherein in said saving step, said test results are classified in accordance with a system identification selected by the operator and said test results are saved in accordance with said system identification.

15. The method as set forth in claim 12, wherein in outputting step, the results are classified in accordance with a system identification selected by the operator and said test results are outputted in accordance with said system identification.

16. The method as set forth in claim 14 or 15, wherein said input parameters and default parameters include identifications of constituent components of the base transceiver station to be tested.

17. The method as set forth in claim 12, wherein said step of confirming further comprises the steps of:

verifying an identification (ID) and a password input by said operator; and outputting an error message when said operator supplied identification and password are not identical with a respective registered identification and password;

wherein at said saving step, said test results are classified in accordance with a system identification selected by the operator and said test results are saved in accordance with said system identification; and wherein at said outputting step, said test results are classified in accordance with said system identification selected by the operator and said classified results are outputted in accordance with said system identification.

18. The method as set forth in claim 17, wherein said input parameters and default parameters include identifications of constituent components of the base transceiver station to be tested.

* * * * *